United States Patent
Ebrahim et al.

(10) Patent No.: US 10,713,283 B2
(45) Date of Patent: Jul. 14, 2020

(54) DATA SET IDENTIFICATION FROM ATTRIBUTE CLUSTERS

(71) Applicant: Microsoft Technology Licensing, LLC, Redmond, WA (US)

(72) Inventors: Saif Ebrahim, Redwood City, CA (US); Tony Yin, Millbrae, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 15/595,426

(22) Filed: May 15, 2017

(65) Prior Publication Data
US 2018/0329980 A1 Nov. 15, 2018

(51) Int. Cl.
*G06F 16/28* (2019.01)
*G06Q 50/00* (2012.01)
*G06F 16/31* (2019.01)
*G06F 16/35* (2019.01)
*G06F 16/25* (2019.01)

(52) U.S. Cl.
CPC ............ *G06F 16/287* (2019.01); *G06F 16/25* (2019.01); *G06F 16/313* (2019.01); *G06F 16/355* (2019.01); *G06Q 50/01* (2013.01)

(58) Field of Classification Search
CPC .... G06F 16/355; G06F 16/287; G06F 16/313; G06F 16/25; G06Q 50/01
See application file for complete search history.

(56) References Cited

U.S. PATENT DOCUMENTS

| | | | | |
|---|---|---|---|---|
| 2012/0110071 | A1* | 5/2012 | Zhou | G06Q 10/10 709/204 |
| 2012/0197733 | A1* | 8/2012 | Skomoroch | G06Q 30/02 705/14.66 |
| 2013/0325779 | A1* | 12/2013 | Shahshahani | G06N 5/00 706/46 |
| 2014/0038146 | A1* | 2/2014 | Liao | G09B 19/00 434/236 |
| 2016/0267616 | A1* | 9/2016 | Smith | G06Q 50/2057 |
| 2016/0307111 | A1* | 10/2016 | Baughman | G06Q 10/06 |
| 2017/0154307 | A1* | 6/2017 | Maurya | G06Q 10/1053 |
| 2017/0193420 | A1* | 7/2017 | Tiwari | G06Q 10/06398 |
| 2017/0221164 | A1* | 8/2017 | Loot | G06Q 50/2057 |
| 2018/0033331 | A1* | 2/2018 | Ihara | G09B 5/02 |
| 2018/0089779 | A1* | 3/2018 | Kenthapadi | G06Q 50/2053 |
| 2018/0096306 | A1* | 4/2018 | Wang | G06Q 10/1053 |
| 2018/0137587 | A1* | 5/2018 | Kenthapadi | G06Q 50/2053 |
| 2018/0137589 | A1* | 5/2018 | Kenthapadi | G06Q 50/2053 |

(Continued)

*Primary Examiner* — Jesse P Frumkin
(74) *Attorney, Agent, or Firm* — Schwegman Lundberg & Woessner, P.A.

(57) ABSTRACT

Systems, devices, media, and methods are presented to identify a set of attributes, generate attribute clusters, and select data sets corresponding to relative values of the attributes within an attribute cluster. The systems and methods receive a first identifier associated with a first member profile of a first member, identifying a set of second members with second member profiles associated with the first member profile, generating a cluster for the first member profile and one or more of the second member profiles. The systems and methods generate a cluster representation with a set of cluster attributes, identify a plurality of data sets associated with a set of core attributes of the cluster attributes, and cause display of an identification of at least one data set.

20 Claims, 8 Drawing Sheets

(56) References Cited

U.S. PATENT DOCUMENTS

2018/0158163 A1* 6/2018 Zhang ................ G06Q 50/2057
2018/0300764 A1* 10/2018 Rohilla .............. G06Q 30/0269
2018/0329909 A1* 11/2018 King, III ................ G06Q 50/01

* cited by examiner

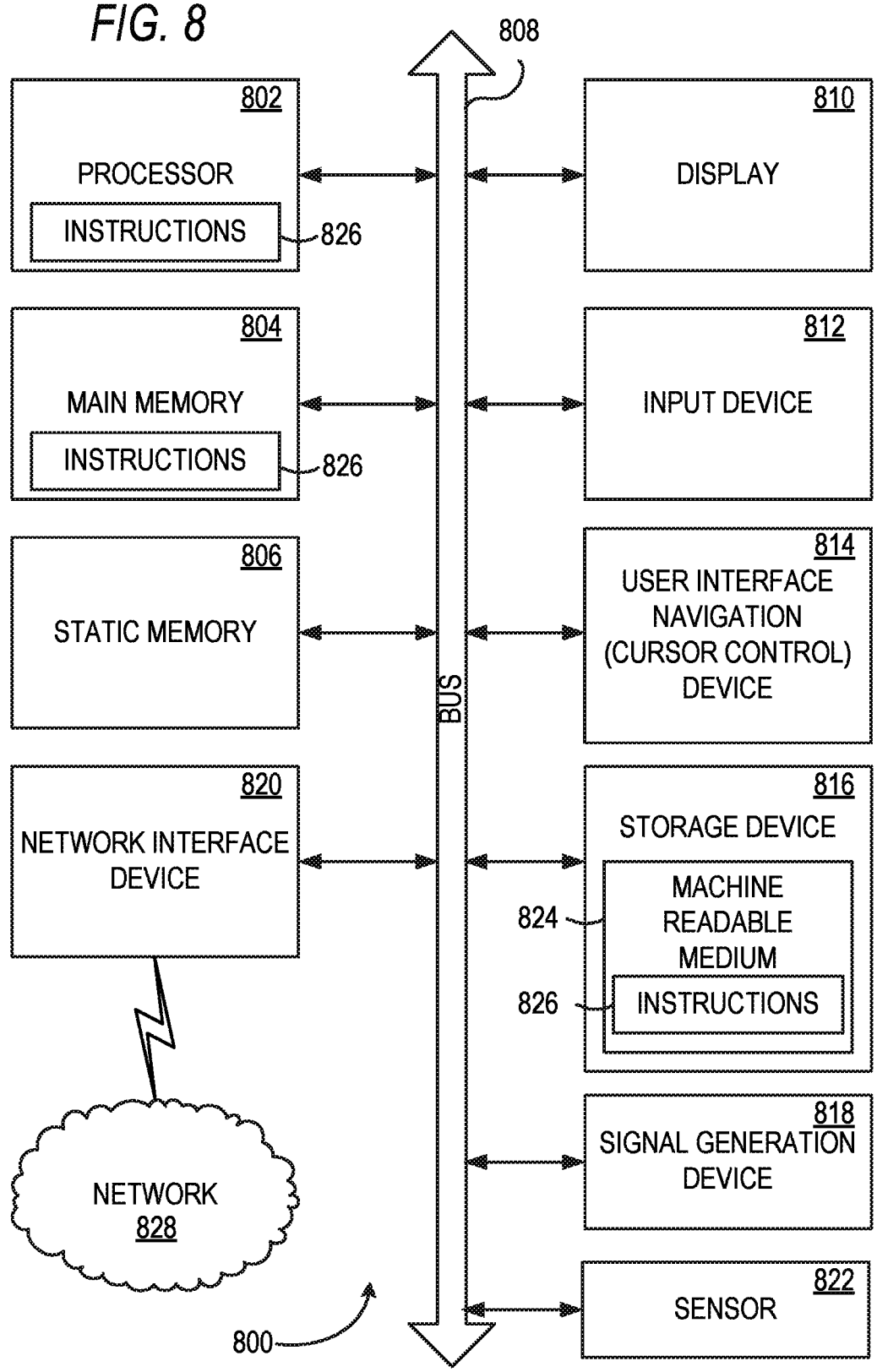

US 10,713,283 B2

DATA SET IDENTIFICATION FROM ATTRIBUTE CLUSTERS

TECHNICAL FIELD

Embodiments of the present disclosure relate generally to the technical field of identifying data sets corresponding to attributes within a defined cluster. Specifically, the present disclosure describes systems and methods to identify a set of attributes, generate attribute clusters, and select data sets corresponding to relative values assigned to attributes within an attribute cluster.

BACKGROUND

Network-based publication systems enable users to publish documents, pages, and other content. Users may access and view published content on the network-based publication system via a network linking the network-based publication system to a client device. A social networking system allows members to declare information about themselves, such as their professional qualifications or skills. In addition to information the members declare about themselves, a social networking system may gather and track information pertaining to behaviors of members with respect to the social networking system and social networks of members of the social networking system.

BRIEF DESCRIPTION OF THE SEVERAL VIEWS OF THE DRAWINGS

Some embodiments are illustrated by way of example and not limitation in the accompanying drawings, in which:

FIG. 8 is a block diagram of a machine in the form of a computing device within which a set of instructions, for causing the machine to perform any one or more of the methodologies discussed herein, may be executed.

DETAILED DESCRIPTION

Figure 1:
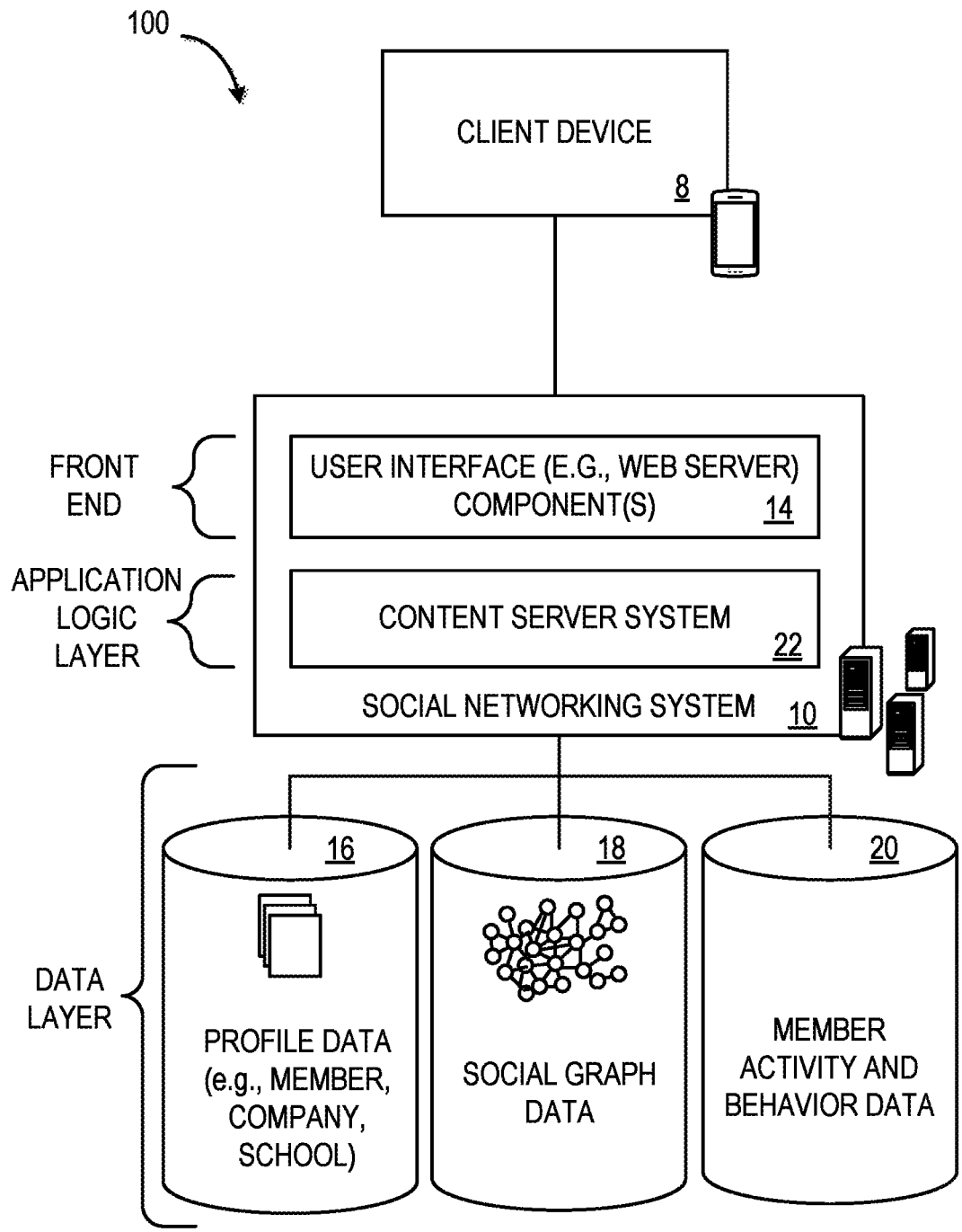
FIG. 1 is a block diagram of the functional components that comprise a computer- or network-based social networking system, including a content server system, consistent with some embodiments described herein.

Example methods and systems are shown for analyzing a social network to predict queries, rankings, and other actions on data sets within a networked system. In some embodiments, the methods and systems described herein enable analysis of a social network to predict member actions within the social networking system. In some example embodiments, a first member of a social network logs one or more changes to a data set (e.g., a member profile) in a social networking system. The one or more changes may correspond to a specified element or element type, such as a job or employment status. A network analysis machine identifies and causes presentation of data sets associated with core attributes corresponding to attributes contained in or absent from attribute clusters. In some embodiments, the network analysis machine identifies data sets as educational or instructional content corresponding to attributes recommended for developing one or more of a department, team, or individual member of the social networking system.

According to some example embodiments described herein, a user, such as a team manager of a company department, interacts with an application. A system (e.g., a content server system) working with the application uses information from the company and a social network to identify a group of users within the team headed by the team manager. The system identifies attributes for the team such as skills, qualifications, education credentials, certification credentials, and other suitable defining attributes. The system presents a portion of the attributes for the members of the team within the application. The system may present the portion of attributes according to a relative strength of the attributes for the team. Presenting the attributes according to their relative strength allows the user to quickly and clearly identify attributes that are important, unimportant, strong, or weak based on the system's analysis of the team. The system also identifies and presents instructional content (e.g., educational or training courses) associated with the attributes. The instructional content may be certification courses, classes, presentations, or other content related to at least one attribute. The identified and presented instructional content may be related to attributes having a lower relative strength for the team or the user. The user may then consume the instructional content (e.g., take an identified course) or recommend the instructional content to members of the team to justify adding the corresponding attribute to their member profiles within the social network or the entity.

In some embodiments, a content server system identifies a strongest set of attributes for a team of members of an entity or within a social networking system. The content server system calculates a strength of each attribute relative to the members of the team and may normalize the strengths of the attributes relative to a highest-valued attribute for the team. The attributes may be presented as a horizontal bar chart. Upon identifying the set of attributes and the relative strengths for each attribute, the content server system gathers the attributes of the team and weights the attributes of the team. The content server system may then determine course strengths relative to a specified user, such as a certain team member, and may determine a skill level for the specified user for one or more of the team attributes. The content server system may then present courses or indications thereof on a graphical user interface for the specified user or another user accessing the content server system.

In determining course strength, the content server system may calculate course strength based on data representative of or related to the course. In some instances, the content server system determines course strength based on course views, course views of members of a team, course views of employees of an entity associated with the team, course views of members associated with a job title of the specified member, a course rating, or any other suitable information relating to the course, the team, the entity, or the social networking system. In such instances, the content server system may present the courses, representations for the courses, or any other suitable content (e.g., data sets) according to the course strength determined for the user.

Social networking systems provide various profile options and services. In some instances, a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system, companies maintaining a social networking presence on the social networking system, and interactions between or among members, companies, and content provided by both the members and companies to the social networking system. As will be discussed in more detail below, information pertaining to members of the social networking system can include data items pertaining to education, work experience, skills, reputation, certifications, and other qualifications of each of the members of the social networking system at particular points during the careers of these members, or interaction data indicating a history of interactions with content on the social networking system. This information pertaining to members of the social networking system may be member-generated to enable individualization of social networking profiles as well as to enable dynamic and organic expansion and discovery of fields of experience, education, skills, and other information relating to personal and professional experiences of members of the social networking system.

Companies, associations, and other entities or groups of people maintain data about departments and employees. This data may include job functions, qualifications, hierarchical structures (e.g., a structure of the department and employment or supervisory relationships of employees within the department), tenure within the entity or job, identifying information for the employees, demographic information for the employees, and any other suitable information relating to one or more of the department and employees of the entity. The social networking system may leverage or otherwise incorporate the entity data for departments and employees to create or enrich the social graph extending among members of the social networking system. In some embodiments, the social networking system uses matching logic on an employee's first name, last name, email address, and company name. The social networking system may then generate logical employee groups reflecting departments of the entity. In some embodiments, the social networking system uses data on the department to generate or verify the logical employee groups of the entity. As will be explained in more detail below, the social networking system may use one or more of the entity's organizational structure and member data of the social networking system to identify the logical groupings amongst employees based on their employment histories and job titles. The employee groups enable the social networking system to determine a team attribute profile including strengths and weaknesses. The social networking system may also generate recommendations of data sets, consumption of which enables members of the group or team to incorporate additional skills, qualifications, or other attributes for team or individual development.

Other aspects of the present inventive subject matter will be readily apparent from the description of the figures that follow.

FIG. 1 is a block diagram 100 of the functional components that comprise a computer- or network-based social networking system 10, consistent with some embodiments of the inventive concepts of the present disclosure. In some embodiments, the social networking system 10 acts as a network-based publication system. In these instances, as shown in FIG. 1, the social networking system 10 is generally based on a three-tiered architecture, comprising a front-end layer, application logic layer, and data layer. As is understood by skilled artisans in the relevant computer- and Internet-related arts, each component or engine shown in FIG. 1 represents a set of executable software instructions (e.g., an instruction set executable by a processor) and the corresponding hardware (e.g., memory and a processor) for executing the instructions. To avoid obscuring the inventive subject matter, various functional components and engines that are not germane to conveying an understanding of the inventive subject matter have been omitted from FIG. 1. However, a skilled artisan will readily recognize that various additional functional components and engines may be used with a social networking system 10, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social networking system 10 is depicted in FIG. 1 as having a three-tiered architecture, the inventive subject matter is by no means limited to such an architecture.

As shown in FIG. 1, the front end comprises a user interface component 14 (e.g., a web server), which receives requests from various client devices 8, and communicates appropriate responses to the requesting client devices 8. For example, the user interface component 14 may receive requests in the form of Hypertext Transfer Protocol (HTTP) requests or other web-based application programming interface (API) requests. The client devices 8 may be executing conventional web browser applications or applications that have been developed for a specific platform to include any of a wide variety of mobile devices and operating systems.

As shown in FIG. 1, the data layer includes several databases, including one or more databases 16 for storing data relating to various entities represented in a social graph. In some embodiments, these entities include members, companies, and/or educational institutions, among possible others. Consistent with some embodiments, when a person initially registers to become a member of the social networking service, and at various times subsequent to initially registering, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, and so on. This information is stored as part of a member's member profile, for example, in the database 16. In some embodiments, a member's profile data will include not only the explicitly provided data, but also any number of derived or computed member profile attributes and/or characteristics.

Once registered, a member may invite other members, or be invited by other members, to connect via the social networking service. A "connection" may mean a bilateral agreement by the members, such that both members acknowledge the establishment of the connection. Similarly, in some embodiments, a member may elect to "follow" another member. In contrast to establishing a "connection," the concept of "following" another member typically is a unilateral operation and, at least in some embodiments, does not include acknowledgement or approval by the member who is being followed. When one member follows another, the member who is following may receive automatic notifications about various activities undertaken by the member being followed. In addition to following another member, a member may elect to follow a company, a topic, a conversation, or some other entity. In general, the associations and relationships that a member has with other members and other entities (e.g., companies, schools, etc.) become part of the social graph data maintained in a database 18. In some embodiments, a social graph data structure may be implemented with a graph database (e.g., the database 18), which is a particular type of database that uses graph structures with nodes, edges, and properties to represent and store data. In this case, the social graph data stored in the database 18 reflects the various entities that are part of the social graph, as well as how those entities are related with one another.

In various alternative embodiments, any number of other entities might be included in the social graph and, as such, various other databases may be used to store data corresponding with the other entities. For example, although they are not shown in FIG. 1, consistent with some embodiments, the social networking system 10 may include additional databases for storing information relating to a wide variety of entities, such as information concerning various online or offline groups, job listings or postings, photographs, audio or video files, and so forth.

In some embodiments, the social networking service may include one or more activity- and/or event-tracking components, which generally detect various member-related activities and/or events, and then store information relating to those activities/events in a database 20. For example, the tracking components may identify when a member makes a change to some attribute of his or her member profile or adds a new attribute. Additionally, a tracking component may detect the interactions that a member has with different types of content. Such information may be used, for example, by one or more recommendation engines to tailor the content presented to a particular member, and generally to tailor the member experience for a particular member.

The application logic layer includes various application server components, which, in conjunction with the user interface component 14, generate various user interfaces (e.g., web pages) with data retrieved from various data sources in the data layer. In some embodiments, individual application server components are used to implement the functionality associated with various applications, services, and features of the social networking service. For instance, a messaging application, such as an email application, an instant messaging application, a social networking application native to a mobile device, a social networking application installed on a mobile device, or some hybrid or variation of these, may be implemented with one or more application server components implemented as a combination of hardware and software elements. Of course, other applications or services may be separately embodied in their own application server components.

As shown in FIG. 1, a content server system 22 is an example application server component of the social networking system 10. The content server system 22 performs operations to identify and cause presentation of one or more data sets associated with core attributes, where the core attributes correspond to attributes contained in or absent from attribute clusters representing a group of members of the social networking system 10. In some embodiments, the content server system 22 operates in conjunction with the user interface component 14 to receive sets of publication data, sets of member data, and member input to generate tailored user interface presentations including data sets and representations of data sets corresponding to specified, desired, or recommended attributes contained within or absent from an attribute cluster of a defined group of members of the social networking system 10. For example, the content server system 22 may render graphical representations of instructional material associated with a specified skill, qualification, or degree, consumption of which justifies incorporating the skill, qualification, or degree as an attribute of a member profile on the social networking system 10.

The social networking system 10 may provide a broad range of applications and services that allow members the opportunity to share and receive information, often customized to the interests of the member. For example, in some embodiments, the social networking system 10 may include a photo-sharing application that allows members to upload and share photos with other members, or a slide-sharing application, which allows members to upload slide decks for sharing among other members. In some embodiments, members of the social networking system 10 may be able to self-organize into groups, or interest groups, organized around a subject or topic of interest. Accordingly, the data for a group may be stored in a database (not shown). When a member joins a group, his or her membership in the group will be reflected in the social graph data stored in the database 18. In some embodiments, members may subscribe to or join groups affiliated with one or more companies. For instance, in some embodiments, members of the social networking system 10 may indicate an affiliation with a company at which they are employed, such that news and events pertaining to the company are automatically communicated to the members. In some embodiments, members may be allowed to subscribe to receive information concerning companies other than the company with which they are employed. Here again, membership in a group, a subscription or following relationship with a company or group, and an employment relationship with a company are all examples of the different types of relationships that may exist between different entities, as defined by the social graph and modeled with the social graph data of the database 18.

Figure 2:
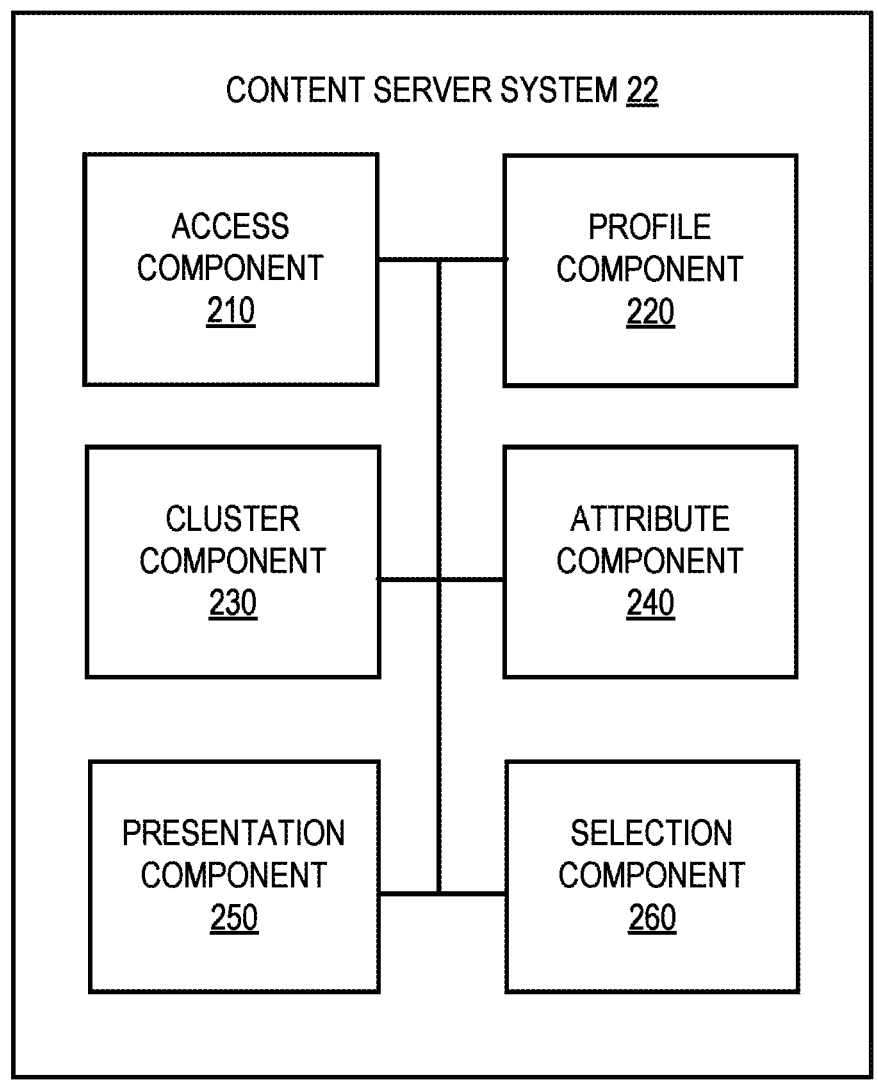
FIG. 2 is a block diagram depicting components of the content server system of FIG. 1, in accordance with an example embodiment.

FIG. 2 is a block diagram 200 depicting some example components of the content server system 22 of FIG. 1. The content server system 22 is shown including an access component 210, a profile component 220, a cluster component 230, an attribute component 240, a presentation component 250, and a selection component 260, all configured to communicate with each other (e.g., via a bus, shared memory, a switch, or a network). Any one or more of the components described herein may be implemented using hardware (e.g., one or more processors specifically configured to perform the operations described herein) or a combination of hardware and software, forming a hardware-software implemented component. For example, any component described herein may configure a processor (e.g., among one or more processors of a machine) as a special-purpose machine, during the pendency of a set of operations, to perform the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
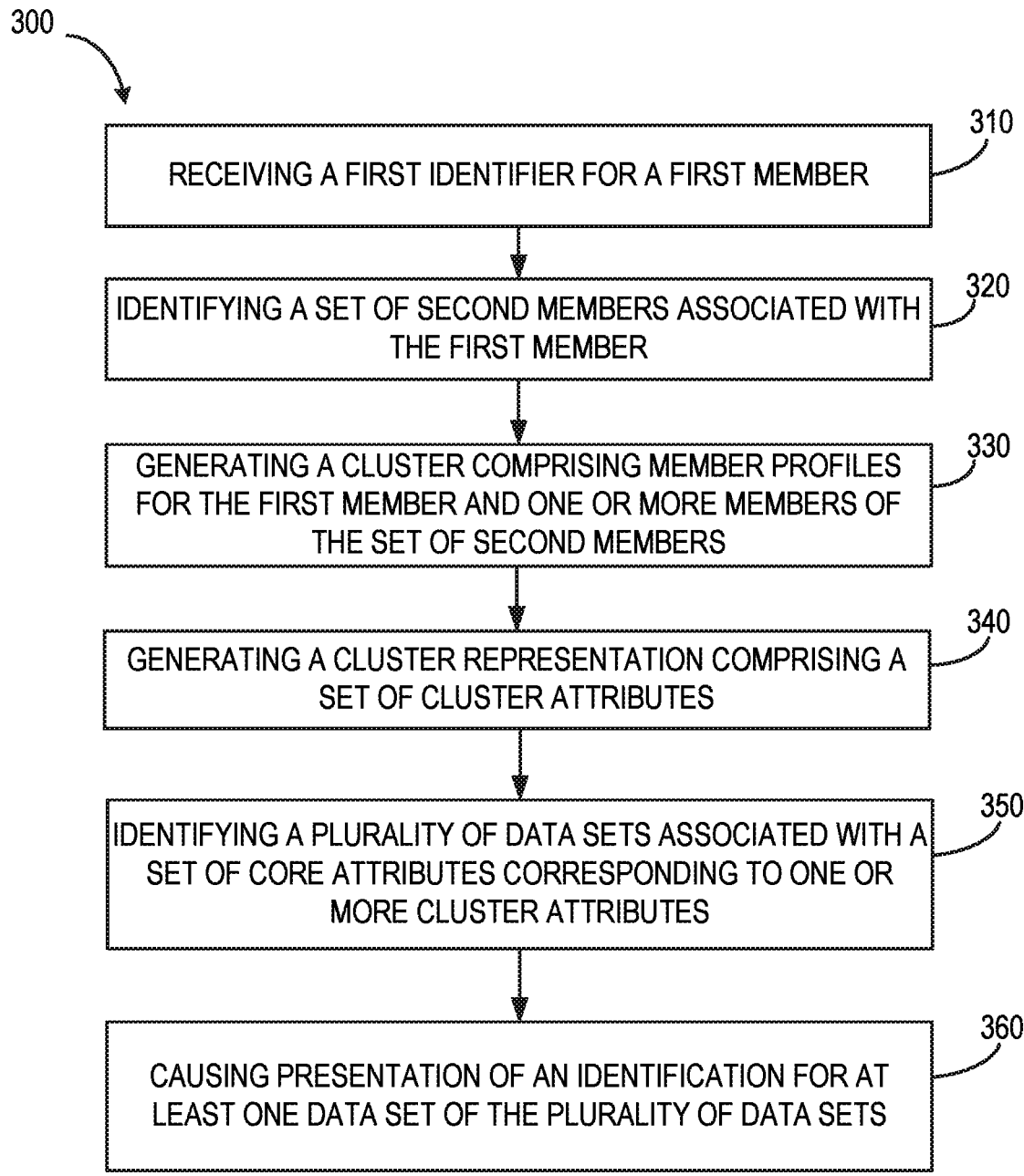
FIG. 3 is a flow diagram illustrating a method of identifying and causing presentation of data sets associated with core attributes corresponding to an attribute cluster, according to some embodiments of the present disclosure.

FIG. 3 is a flow diagram illustrating an example method 300 of identifying and causing presentation of data sets associated with core attributes corresponding to attributes contained in or excluded from attribute clusters for a set of members, consistent with various embodiments described herein. For example, the method 300 may comprise identifying groups of members, identifying attributes for each group of members, and generating attribute clusters. The content server system 22 may then determine selected attributes included within each attribute cluster, underrepresented within the attribute cluster, unevenly distributed among the group, absent from the group, absent from specified members of the group, desired, or otherwise suitable for incorporation into or expansion within the attribute cluster. The content server system 22 may then identify and present data sets corresponding to the selected attributes. The method 300 may be performed, at least in part, by, for example, the content server system 22 illustrated in FIG. 2 (or an apparatus having similar components or operative programming, such as one or more client machines or application servers).

In operation 310, the access component 210 receives a first identifier for a first member. The first identifier is associated with a first member profile comprising attributes of the first member. In some embodiments, the access component 210 receives the first identifier from a computing device associated with the first member. In such embodiments, the first member logs into the social networking system 10. In response to receiving a login request from the first member, the social networking system 10 passes the first identifier to the access component 210. In some instances, the access component 210 receives an indication or notification directing the access component 210 to access or otherwise retrieve a specified identifier (e.g., the first identifier) associated with a specified member (e.g., the first member). In such instances, the access component 210 receives the indication or notification from the social networking system 10 in response to the login of the first member. The indication may enable the social networking system 10 to cause the content server system 22 to initiate the method 300 without passing the login or other personal information of the first member directly to the access component 210.

Although operation 310 is described with respect to receiving a first identifier for a first member of the social networking system 10, in some embodiments, the access component 210 receives a first identifier for a first member associated with a social network or third-party system (e.g., a third-party database, a publicly available database, or another suitable set of accessible data) other than the social networking system 10. In such embodiments, the access component 210 receives the first identifier in a manner indicating or including an indication (e.g., an accompanying portion of data or metadata) of a social network or third-party system with which the first member is associated and at which data representing the first member may be stored.

In some instances, upon receiving the first identifier indicating the other social network or third-party system, the access component 210 retrieves data representing the first member from the other social network or third-party system. For example, where the first member is associated with the social networking system 10, the access component 210 may retrieve a first member profile (e.g., data for the first member) from the social networking system 10 in response to receiving the first identifier. In some instances, the access component 210 retrieves, as part of the data representing the first member, one or more of an employee profile for the first member, member profiles for members in a team or department of the first member, data representing a department of the first member, and any other suitable information.

The access component 210 may retrieve the data representing the first member via a request transmitted to the third-party system for publicly available information or information stored on the third-party system (e.g., non-public information). The access component 210 may pass the data representing the first member to another component of the content server system 22 to map the data of the first member to a format, organizational structure, or other standard structure or content associated with data of the content server system 22 or the social networking system 10. For example, information relating to attributes (e.g., skills) of the first member, retrieved from the third-party system, may be mapped to a standard set of attributes of the social networking system 10. In embodiments of the above-referenced example or similar embodiments, the standard attributes of the social networking system 10, to which the attributes of the first member have been mapped, may be passed to one or more other components of the content server system 22 for use in the methods disclosed herein as a set of attributes representing the first member.

In some instances, the first member, for whom the first identifier or member data is retrieved, may be a member other than the user interacting with the content server system 22. In such embodiments, the first member may be a member associated with a group of members or a team, such as a set of second members, described in more detail below. The user or member interacting with the content server system 22 may be a team leader, another group member, or any other suitable user of the system associated with one or more of the first member, a set of members including the first member, an entity corresponding to the interacting member and the first member, or the like. For example, the interacting user may be a team leader, a human resources representative, or a department head. The user may interact with the content server system 22 to identify attributes or skills of the set of members including the first member and to determine which of the attributes or skills should be supplemented, developed, or increased for the benefit of the team or one or more members of the team.

In operation 320, the profile component 220 identifies a set of second members associated with the first member. The set of second members are associated with a set of second identifiers. The set of second identifiers are associated with a set of second member profiles. In some embodiments, the association among a second member, a second identifier, and a second member profile defines a relationship representing each second member with a specified member profile and a specified identifier within the social network. Each member profile of the set of second member profiles comprises member attributes and one or more links to other members of the social networking system 10. In some instances, the set of second member profiles comprises a set of attributes and a set of links. The set of attributes may be understood as the attributes of the second members associated with the set of second member profiles. The set of links may be understood as the one or more links of each member profile of members grouped in the set of second members.

In some instances, to identify the set of second members, the profile component 220 accesses a first member profile of the first member on the social networking system 10. Upon accessing the first member profile, the profile component 220 identifies data representing a set of associations, links, friend lists, or other structures indicating a relationship between the first member and one or more other members of the social networking system 10. In some instances, the profile component 220 identifies relationship data by accessing a data structure storing member links, associations, friendships, connections, or other relationships. The profile component 220 may also parse the first member profile to identify such relationships. For example, the profile component 220 may use text recognition, language recognition, or natural language processing techniques to identify text within the first member profile identifying relationships between the first member and other members of the social networking system 10. In response to identifying the members of the social networking system 10 with whom the first member is connected or otherwise associated, the profile component 220 identifies the connected members of the social networking system 10 as the set of second members and retrieves second identifiers for each member of the set of second members. The second identifiers may be stored in member profiles for each member of the set of second members.

In operation 330, the cluster component 230 generates a cluster comprising the first member profile and one or more member profiles of the set of second member profiles. In some embodiments, the cluster component 230 generates the cluster by accessing the first member profile and the one or more member profiles of the set of second member profiles to obtain attributes associated with each member profile. In some instances, the attributes comprise a list of skills, qualifications, certifications, or other data representing abilities of each member. The cluster component 230 then links the attributes extracted from the member profiles into an attribute cluster for the members represented by the first member profile and the set of second member profiles.

In some embodiments, in generating the cluster, the cluster component 230 identifies an organizational scheme including the first member and at least a portion of the second members of the set of second members. The organizational scheme may indicate a relative position (e.g., job, job level, or team membership) of each of the first member and the set of second members within an entity or organization (e.g., employer). The organizational scheme may link the first member and the portion of the second members as a team or set of coworkers within the entity or organization. In such embodiments, the organizational scheme comprises a set of categories. Each member of the first member and the portion of the second members may be associated with at least one category of the set of categories.

In response to identifying the organizational scheme, the cluster component 230 may generate a set of associations between the first member and one or more second members of the portion of second members. The set of associations may represent an organizational relationship among the first member and the one or more second members. In some embodiments, the cluster component 230 extracts attributes (e.g., skills, qualifications, or certifications) from each member profile of the first member and the portion of second members. The cluster component 230 then generates an association among the extracted attributes. The association represents a team, department, or job function delineation indicating that the extracted attributes are attributes of members of the team, department, or job function within a specified entity or organization.

In some embodiments, the cluster component 230 generates the cluster for the first member and the set of second members, or a portion thereof, by identifying a connection density among the first member and the set of second members. In such embodiments, the cluster component 230 includes in the cluster the members having a connection density to the other identified members exceeding a connection threshold. In some embodiments, the connection threshold may be understood to be a minimum connection density (e.g., number of connections to other identified members), above which the member is selected for inclusion in the cluster. In some instances, the cluster component 230 generates the cluster based on job function, job title, department, entity or organization, any other suitable characteristic common to member profiles for the first member and the set of second members, or combinations thereof. For example, in some instances, the cluster component 230 generates a first cluster of the first member and the portion of second members based on member profiles of the identified members sharing a common job function. The cluster component 230 then generates a second cluster incorporating connection density among the identified members. In such instances, the cluster component 230 edits membership of the first cluster (e.g., pares members from or adds members to the first cluster) based on connection density and the connection threshold, to produce the second cluster.

In some embodiments, after generating the cluster, or the second cluster, of member profiles, the cluster component 230 identifies attributes included in the member profiles of members selected for inclusion in the cluster. The cluster component 230 then generates the attribute cluster from the attributes extracted from the member profiles of the selected members. In some instances, in generating the attribute cluster, the cluster component 230 determines an inclusion frequency for each attribute representing a number of times the attribute occurs in the cluster. The cluster component 230 may also determine the inclusion frequency as a number of times the attribute occurs in the cluster and divide the number of occurrences by a number of members in the cluster. Upon determining the inclusion frequency for each attribute, the cluster component 230 may edit the attribute cluster to remove or identify attributes having an inclusion frequency value below a frequency threshold. In such instances, the frequency threshold may be understood as a number or value below which an attribute is removed or pared from the attribute cluster. In some embodiments, the frequency threshold may be understood as a number or value below which the attribute is identified or noted. Identifying or noting the attributes enables the content server system 22 to identify data sets (e.g., instructional content) associated with the attributes, as described below in more detail.

In some embodiments, in generating one or more of the cluster or the attribute cluster, the cluster component 230 may identify a third-party cluster scheme (e.g., the organizational scheme, a group, a grouping methodology, a team, or a department). The cluster component 230 may use the third-party cluster scheme to generate the cluster. In some instances, the cluster component 230 uses the third-party cluster scheme to generate an initial cluster. Upon generating the initial cluster, the cluster component 230 generates a subsequent cluster using one or more of the methodologies or clustering techniques described above. In some instances, the cluster component 230 generates the initial cluster using one or more of the methodologies or clustering techniques described above, and generates the subsequent cluster using the third-party cluster scheme.

In operation 340, the cluster component 230 generates a cluster representation. In some embodiments, the cluster representation comprises a set of cluster attributes. The set of cluster attributes comprises at least a portion of the attributes of the first member and the attributes of the set of second members. The set of cluster attributes may comprise or may be selected from the attribute cluster. For example, the cluster representation may be generated in a manner similar to that shown in FIG. 4.

Figure 4:
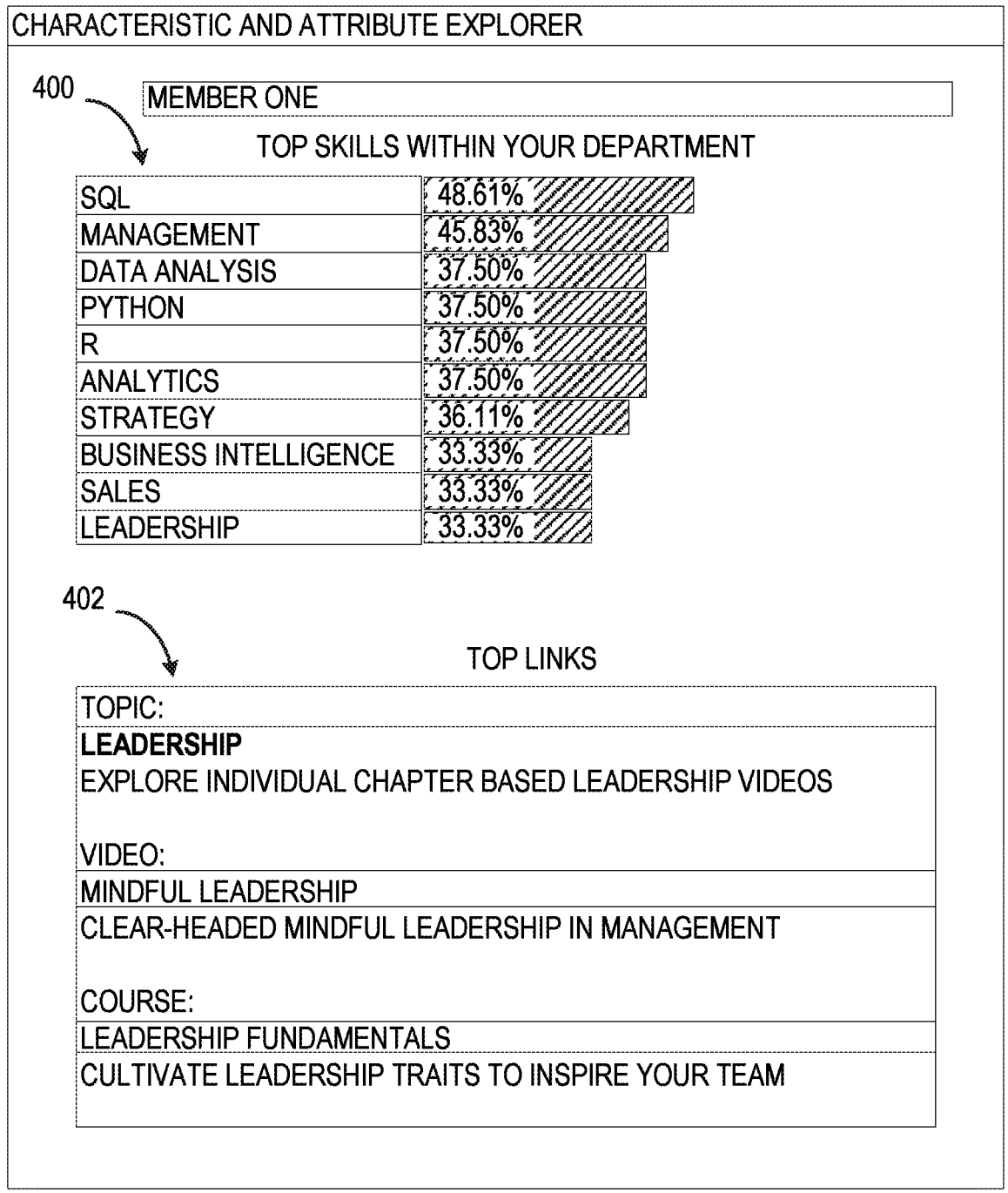
FIG. 4 is a user interface diagram depicting an organized set of attributes, according to some example embodiments.

In some embodiments, the cluster component 230 generates the cluster representation as a graph indicating one or more of an attribute title, a relative strength, a number of members, or any other suitable representation of attributes among members included in the cluster. As shown in FIG. 4, in some instances, the cluster representation is generated as a bar graph 400 indicating a title of each cluster attribute and a relative number or percentage of members associated with the cluster attribute, and ordered according to the relative number or percentage of members with a member profile including each cluster attribute. Although the cluster representation is shown as a bar graph, it should be understood that the cluster representation may be generated as a pie chart, a cluster graph, a pictograph, a cosmograph, or any other suitable graphical representation.

In some embodiments, the cluster representation indicates, shows, lists, or otherwise represents one or more of a strength of an attribute, a number of courses taken in relation to an attribute, a number of courses used to substantiate an attribute (e.g., a number of courses taken to receive a certificate), or any other metric qualifying, quantifying, or otherwise delineating a presence or level of an attribute held by members of the cluster. The strength of the attribute may represent a number of members of the cluster, team, or other group listing the attribute in an associated profile. In some instances, the strength of the attribute represents a number or percentage of members within the cluster, team, or other group listing the cluster attribute in a member profile relative to a total number of members of the social networking system 10 listing the cluster attribute in a member profile.

In some instances, the cluster component 230 may determine a strength of an attribute as a ratio of a number of members of the set of second members with that attribute relative to a total number of members of the set of second members. For example, where the set of second members includes ten members, five of whom include SQL as an attribute in a member profile, the cluster component 230 may determine a strength of the SQL attribute by dividing the five members by the ten total members. As will be described in more detail below, the cluster component 230 incorporates one or more additional values or considerations into determining a strength of an attribute. For example, the cluster component 230 may incorporate endorsements, validations, normalizations, or other values or additional calculations in determining a strength of the attribute. In example embodiments, the cluster component 230 may determine a strength of the SQL attribute within the set of second members by dividing the five members with SQL in a member profile by the ten total members of the set of second members. The cluster component 230 may then multiply a percentage resulting from the initial calculation by an average number of relative endorsements per member with SQL listed as an attribute.

In operation 350, the attribute component 240 identifies a plurality of data sets associated with a set of core attributes. In some embodiments, at least one core attribute of the set of core attributes corresponds to one or more attributes of the set of cluster attributes. The attribute component 240 may identify the plurality of data sets by parsing a listing, database, or other suitable data structure comprising a set of data sets. Each data set may be stored within the data structure with one or more core attributes categorizing, classifying, or otherwise indicating content of the data set. In parsing the data structure, the attribute component 240 matches one or more attributes of the set of cluster attributes with at least one core attribute stored within the data structure. The attribute component 240 then identifies the plurality of data sets as those data sets associated with the at least one core attribute.

In operation 360, the presentation component 250 causes display of an identification for at least one data set of the plurality of data sets at a display device associated with the first member. In some embodiments, the at least one data set is selected based on one or more of the first member profile, the cluster representation, and the set of core attributes. In some instances, the at least one data set is selected by the selection component 260 prior to presentation of the identification by the presentation component 250. As shown in FIG. 4, in some embodiments, the indication of the at least one data set may be presented as a link (e.g., a hyperlink), a video, a document, a file, or any other format capable of conveying content of the data set. As shown, the indication of the at least one data set may be presented within a graphical user interface simultaneously displaying or presenting one or more of the cluster attributes. The indication of the at least one data set may also be presented in response to selection of a link or user interface element corresponding to a cluster attribute. In such embodiments, the first member selecting a user interface element for a skill or attribute of leadership may cause presentation of a plurality of data sets 402 associated with the leadership attribute.

Although described with respect to initially receiving a first identification for the first member, the method 300 may be performed dynamically based on interactions or activities of the first member, a member of the set of second members, or another member or user of one or more of the social networking system 10 and the content server system 22. For example, as the first member or other user interacts with the content server system 22 by consuming content, and with the social networking system 10 by incorporating additional attributes into a member profile, based on the content consumption, the operations of the method 300 may periodically or continually update. Such updating may modify attributes and data sets being presented, modify positions or depictions of attributes and data sets, and combinations thereof. Such updating may cause changes in the position of attributes and data sets, number of the attributes and data sets, and which attributes or data sets are presented within the graphical user interface. In some embodiments, the updating is performed in real time or near-real time as the member or user interacts with the social networking system 10 or the content server system 22.

Figure 5:
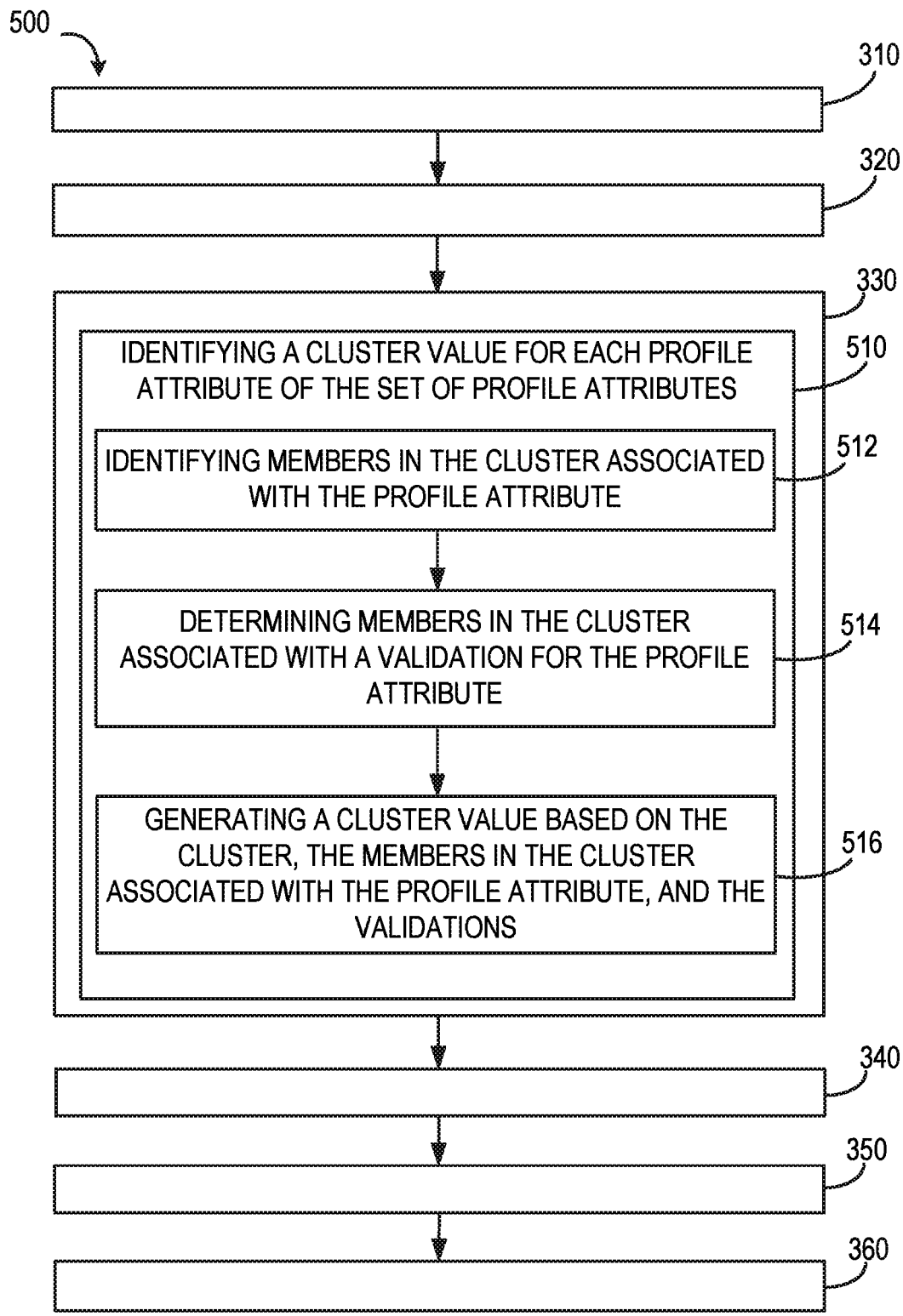
FIG. 5 is a flow diagram illustrating a method of identifying and causing presentation of data sets associated with core attributes corresponding to an attribute cluster, according to some embodiments of the present disclosure.

FIG. 5 is a flow diagram illustrating a method 500 of identifying and causing presentation of data sets associated with core attributes corresponding to attributes contained in or excluded from attribute clusters for a set of members, consistent with various embodiments described herein. The method 500 may be performed, at least in part, by, for example, the content server system 22 illustrated in FIG. 2 (or an apparatus having similar components, such as one or more client devices 8 or application servers). In some embodiments, the method 500 includes one or more operations from the method 300. In some instances, the method 500 is performed as a sub-operation or other part of operation 330.

In operation 510, the cluster component 230 identifies a cluster value for each profile attribute of the set of profile attributes. The cluster value for each profile attribute corresponds to attributes of the second members associated with the profile attribute. In some embodiments, the cluster value for each attribute is a numerical value representing a characteristic of the attribute. In such embodiments, the characteristic is one or more of a number of members having a profile including the attribute, a percentage of members having a profile including the attribute, a number or percentage of members in the set of second members with a profile including the attribute relative to a number of members outside of the set of second members having the same attribute, any other suitable characteristic or metric described herein, or combinations thereof. In some instances, operation 510 includes one or more sub-operations.

In operation 512, the cluster component 230 identifies members in the cluster associated with the profile attribute. The cluster component 230 may identify the members in the cluster as being associated with a specified attribute by parsing member profiles of the members in the cluster. In some embodiments, the cluster component 230 parses the profiles using text recognition, language recognition, natural language processing, or any other suitable text analysis methods or techniques. In some instances, the cluster component 230 parses the profiles by determining a type of attribute for the profile attribute and determining whether a matching attribute occurs in a field specified within the profile for the type of attribute of the profile attribute. The cluster component 230 may also parse the profiles by parsing an attribute data structure associated with each profile. In such embodiments, the cluster component 230 may parse, using one or more text recognition operations, the attribute data structure (e.g., metadata associated with the profile) to identify an attribute within the profile, or the attribute data structure, matching the profile attribute.

In operation 514, the cluster component 230 determines members in the cluster associated with a validation for the profile attribute. A validation may be understood as an accolade, an endorsement, an approval, a recommendation, a like, a thumbs up, or any other suitable recognition of the profile attribute in a profile of a member in the set of second members. The validation may be given, applied, transmitted, or otherwise credited by another member of the social networking system 10. When a validating member registers a validation for a second member of the set of second members, the validating member may select a user interface element acknowledging an attribute in the second member's profile. The cluster component 230 may receive the validation and store a validation indication in the member profile of the second member in association with the profile attribute. In determining the validation for the profile attribute, the cluster component 230 identifies the validation indication within the second member's profile associated with the profile attribute.

In some instances, the cluster component 230 may determine validations for use in generating cluster values from a plurality of validations. In such instances, the cluster component 230 identifies relative validations or endorsements for inclusion in cluster value calculations as validations received from a member having an attribute within a member profile matching the attribute for which the validation is being given. For example, a validation for a member with SQL listed as a skill in a member profile may be received from a second member having a member profile containing SQL as a skill. Such a validation may be included in generating the cluster value. In some embodiments, the cluster component 230 uses validations of members with matching skills who also have a job function or title listed in a member profile which matches the job function or title of the member receiving the validation.

In operation 516, the cluster component 230 generates the cluster value based on the cluster, the members in the cluster associated with the profile attribute, and the members in the cluster having the validation. In some embodiments, the cluster component 230 determines a total number of members within the cluster. The cluster component 230 then determines a number of members associated with the profile attribute. The cluster component 230 then determines a number of members in the cluster having a profile attribute associated with a validation. The cluster component 230 may then generate the cluster value as a percentage of member profiles including the profile attribute or a percentage of member profiles including a validation for the profile attribute. The cluster component 230 may also generate the cluster value as a percentage of member profiles including the profile attribute, weighted by the number or percentage of member profiles including a validation for the profile attribute. For example, where the cluster component 230 generates cluster values for a plurality of profile attributes, the cluster component 230 may generate each cluster value as a percentage of member profiles including a specified profile attribute. The cluster component 230 may then organize the plurality of cluster values by weighting each cluster value with a number or percentage of member profiles including a validation for the specified profile attribute.

In some instances, in weighting the cluster values, the cluster component 230 incorporates a value associated with the validations into the cluster value generated for the profile attribute. The cluster component 230 may incorporate the value by adding the value (e.g., a number, a percentage, or a derived value of member profiles with a validation for the profile attribute) to the cluster value for the profile attribute. The cluster component 230 may also normalize (e.g., multiply), average, or otherwise manipulate the cluster value by the value associated with the validations for the profile attribute.

Figure 6:
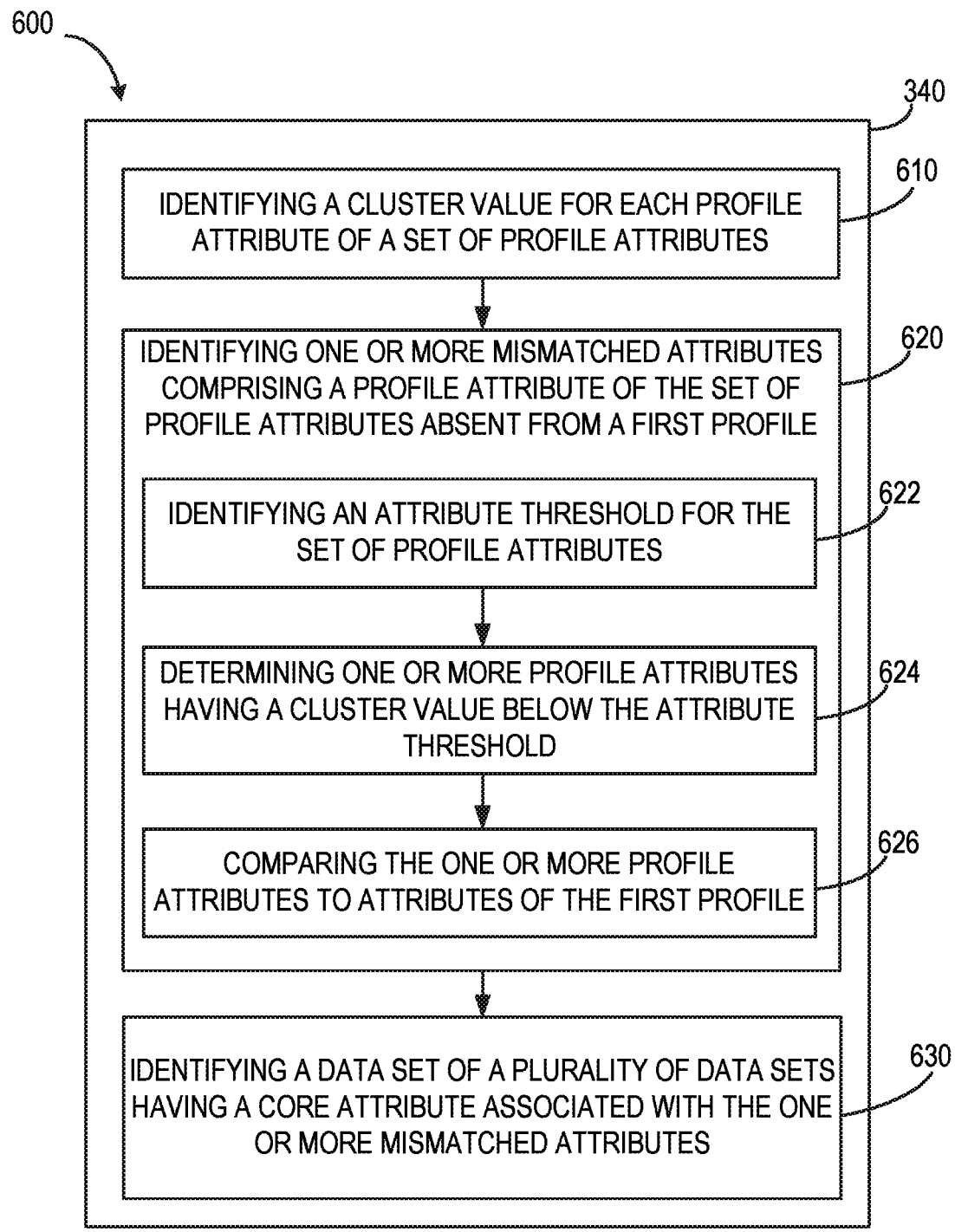
FIG. 6 is a flow diagram illustrating a method of identifying and causing presentation of data sets associated with core attributes corresponding to an attribute cluster, according to some embodiments of the present disclosure.

FIG. 6 is a flow diagram illustrating an example method 600 of identifying and causing presentation of data sets associated with core attributes corresponding to attributes contained in or excluded from attribute clusters for a set of members, consistent with various embodiments described herein. The method 600 may be performed, at least in part, by, for example, the content server system 22 illustrated in FIG. 2 (or an apparatus having similar components, such as one or more client devices 8 or application servers). In some embodiments, the method 600 is performed as a sub-operation or other part of the methods 300 or 500. As shown in FIG. 6, the method 600 is performed as one or more sub-operations of operation 340 in the method 300.

In operation 610, the cluster component 230 identifies a cluster value for each profile attribute of the set of profile attributes. The cluster value for each profile attribute may correspond to attributes of the second members associated with the profile attribute. In some embodiments, the cluster component 230 identifies or determines the cluster value as described above. In some instances, the cluster values are predetermined or previously determined by one or more operations, as described above. In such instances, the cluster component 230 identifies the cluster value by parsing a data structure storing the cluster values. In some embodiments, data structures containing the cluster values may be stored with or in association with the member profiles containing the profile attributes for which the cluster values are generated. In some instances, the data structure is stored with or in association with an indication or representation of the cluster corresponding to profile assets or attributes.

In operation 620, the cluster component 230 identifies one or more mismatched attributes comprising a profile attribute of the set of profile attributes absent from the first member profile. The cluster component 230 may identify the mismatched attribute by comparing attributes of the first profile and the set of profile attributes using text recognition, language recognition, profile values (e.g., standard values assigned to specified attributes within the social networking system 10), or any other suitable method. In some instances, operation 620 includes one or more sub-operations.

In some embodiments, in operation 622, the cluster component 230 identifies an attribute threshold for the set of profile attributes. The attribute threshold may be a value representing a number, percentage, or other threshold of member profiles, within a defined group of members, containing a specified profile attribute. In some embodiments, the value of the attribute threshold represents a level below which saturation of the profile attribute may be considered deficient. In some instances, the value of the attribute threshold is predetermined. The value of the attribute threshold may also be determined at a time of (e.g., a same time as, a time proximate to, or a time following) identifying the profile attribute of interest.

In operation 624, the cluster component 230 determines one or more profile attributes having a cluster value below the attribute threshold. The cluster component 230 may determine relative levels of the cluster values of the one or more profile attributes and the attribute threshold by comparing the cluster values to the value for the attribute threshold. The cluster component 230 may compare the values using a simple mathematical comparison (e.g., determining an inequality between two values). In some instances, the cluster component 230 compares cluster values and the attribute threshold value by weighting or otherwise adjusting each cluster value (e.g., increasing or decreasing the cluster value of a profile attribute) prior to comparing the cluster value and the attribute threshold. Once the cluster component 230 determines that at least one profile attribute is associated with a cluster value below the attribute threshold, the cluster component 230 may perform additional processing on that at least one profile attribute.

In operation 626, the cluster component 230 compares the one or more profile attributes to attributes of the first profile to identify the one or more mismatched attributes. In some embodiments, the cluster component 230 compares the one or more profile attributes (e.g., the at least one profile attribute with a cluster value below the attribute threshold) to the first profile in a manner similar to that described above, by parsing the first profile to determine whether the one or more profile attributes occur within or are associated with the first profile. Where a profile attribute is not among the attributes listed within or associated with the first profile, the cluster component 230 selects that attribute as a mismatched attribute.

In operation 630, the cluster component 230 identifies a data set of the plurality of data sets having a core attribute associated with the one or more mismatched attributes. The cluster component 230 identifies data sets by comparing attributes associated with each of the plurality of data sets to the one or more mismatched attributes. In some embodiments, the cluster component 230 may identify the data sets by parsing a data table or other data structure mapping core attributes to data sets of the plurality of data sets. Where the cluster component 230 determines or identifies a match between a mismatched attribute and a core attribute, the cluster component 230 selects the data set corresponding to the core attribute for inclusion in the data sets presented to the first member.

Figure 7:
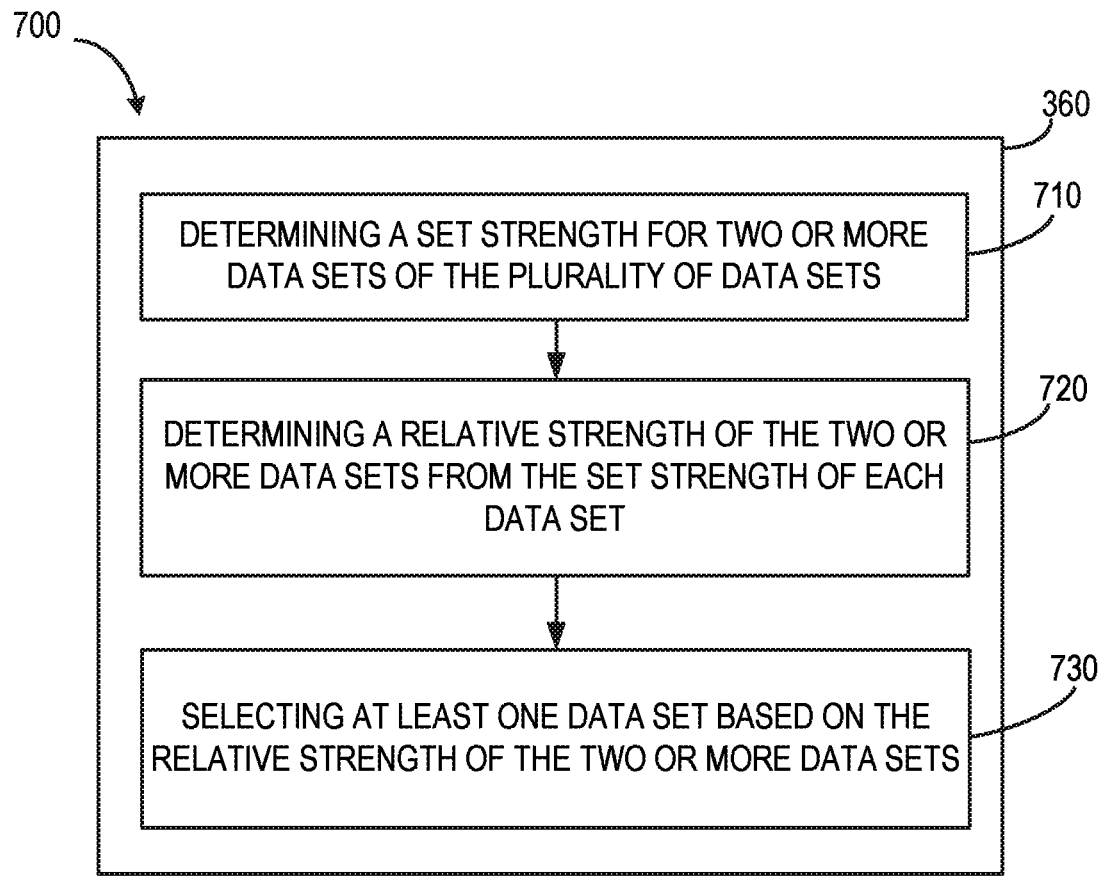
FIG. 7 is a flow diagram illustrating a method of identifying and causing presentation of data sets associated with core attributes corresponding to an attribute cluster, according to some embodiments of the present disclosure.

FIG. 7 is a flow diagram illustrating an example method 700 of identifying and causing presentation of data sets associated with core attributes corresponding to attributes contained in or excluded from attribute clusters for a set of members, consistent with various embodiments described herein. The method 700 may be performed, at least in part, by, for example, the content server system 22 illustrated in FIG. 2 (or an apparatus having similar components, such as one or more client devices 8 or application servers). In some embodiments, the method 700 is performed as a sub-operation or other part of the methods 300, 500, or 600. As shown in FIG. 7, the method is performed as one or more sub-operations of operation 360 in the method 300.

In operation 710, the selection component 260 determines a set strength for two or more data sets of the plurality of data sets. The data set strength represents one or more of a number of interactions with the data set, a type of interaction with the data set, and a member attribute value for members interacting with the data set. In some embodiments, the selection component 260 determines the set strength for each of the two or more data sets by determining a number of members of the set of second members having or performing an interaction with the two or more data sets. For example, if two data sets (e.g., courses) are returned for an SQL skill, each data set having ten views, but only one data set having been completed by two members of the set of second members, the data set completed by the two members of the set of second members may receive a higher set strength.

The selection component 260 determines the type of interactions between members of the set of second members and the two or more data sets. The selection component 260 determines the member attribute value as a number of members of the set of second members having a member profile including one or more attributes corresponding to the data set. The selection component 260 may generate a set strength value or score for each data set of the two or more data sets by generating a score for each data set using the number of members performing the interaction, the type of interactions performed by the members (e.g., a level of completeness of the interactions), and the number of members having profiles including the attributes. In such embodiments, the set strength for a data set indicates a connection strength of the data set with the set of second members.

In some instances, the types of interactions comprise one or more of viewing a data set, selecting the data set, consuming the data set, recommending the data set, and incorporating an indicator of the data set into a member profile. Interactions may also include data set rating, such as the act of members rating a data set or an average rating given to a data set by members who have consumed the data set. Viewing the data set may be performed by interacting with or being presented with a graphical user interface screen including a title or other indication of the data set. In some embodiments, viewing the data set may represent a total number of data set views; a number of data set views by a member of the set of second members with a same job title as the first member or user; a number of data set views by an employee at a company associated with the first member or user, where the employee has a same job title and is excluded from the set of second members (e.g., is in another team); and a number of data set views by viewers at other companies with a same job title as the first member. Each type of data set view may be assigned a weight, based on a similarity of the member performing the viewing, to the first member. Selecting the data set may be performed by clicking on a link for the data set, initiating presentation of the data set, or any other initial interaction with the data set enabling presentation of the data set. Consuming the data set may be performed by watching, listening to, or otherwise receiving presentation of the content of the data set within a graphical user interface. In some instances, consuming the data set includes completing a questionnaire associated with the data set. Completion of the questionnaire and receiving a score above a passing threshold may indicate that the member viewed or otherwise consumed and retained the content of the data set. In some embodiments, the types of interactions indicate a level of completeness of a member interacting with the data set. The selection component 260 may weight values for each of the interaction types, based on a level, amount of time, or amount of interaction between a member and a data set sufficient to satisfy a predetermined interaction threshold of the type of interaction.

In operation 720, the selection component 260 determines a relative strength of the two or more data sets from the data set strength of each data set of the two or more data sets. In some embodiments, the selection component 260 identifies the set strength for each data set of the two or more data sets. In some instances, the selection component 260 compares the set strengths of the two or more data sets. The selection component 260 may determine the relative strength of the two or more data sets by generating a ranking or ordering of the two or more data sets based on the set strengths of each data set. In some embodiments, the rank or order is generated by positioning the two or more data sets in a list in descending order of set strength.

In operation 730, the selection component 260 selects at least one data set based on the relative strengths of the two or more data sets. In some embodiments, the at least one data set comprises data sets having a set strength or rank above a defined threshold. In some instances, the selection component 260 selects the at least one data set as having a set strength above a defined threshold and excluding data sets of the two or more data sets with which the first member has already interacted. In some embodiments, the selection component 260 excludes data sets of the two or more data sets from selection where the member profile of the first member already includes one or more attributes corresponding to a specified data set or data sets.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented components or objects that operate to perform one or more operations or functions. The components and objects referred to herein may, in some example embodiments, comprise processor-implemented components and/or objects.

Similarly, the methods described herein may be at least partially processor-implemented. For example, at least some of the operations of a method may be performed by one or more processors or processor-implemented components.

The performance of certain operations may be distributed among the one or more processors, not only residing within a single machine or computer, but deployed across a number of machines or computers. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

FIG. 8 is a block diagram of a machine in the form of a computer system 800 within which a set of instructions, for causing the machine to perform any one or more of the methodologies discussed herein, may be executed. For example, the computer system 800 may be a server functioning as the content server system 22. In some instances, the computer system 800 may be a set of similar computing devices storing instructions capable of configuring a processor of the computer system 800 as one or more of the components (hardware-software implemented components) described above. The configuration of a component, even for a period of time, causes the computer system 800 to act as a special-purpose computing device for performing one or more operations associated with the component, as described in the present disclosure. In some embodiments, the computer system 800 may function as the social networking system 10, with portions (e.g., hardware and instructions) partitioned to function as one or more of the components, interfaces, or systems described above during specified operations associated with those aspects of the components, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In various embodiments, the machine may be a server computer; however, in alternative embodiments, the machine may be a personal computer (PC), a tablet PC, a set-top box (STB), a personal digital assistant (PDA), a mobile telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processor 802 (e.g., a central processing unit (CPU), a graphics processing unit (GPU), or both), a main memory 804, and a static memory 806, which communicate with each other via a bus 808. The computer system 800 may further include a display unit 810, an alphanumeric input device 812 (e.g., a keyboard), and a user interface (UI) navigation device 814 (e.g., a mouse). In one embodiment, the display unit 810, alphanumeric input device 812, and UI navigation device 814 are a touch screen display. The computer system 800 may additionally include a storage device 816 (e.g., drive unit), a signal generation device 818 (e.g., a speaker), a network interface device 820, and one or more sensors 822, such as a global positioning system sensor, compass, accelerometer, or other sensor.

The storage device 816 includes a machine-readable medium 824 on which is stored one or more sets of instructions 826 and data structures embodying or utilized by any one or more of the methodologies or functions described herein. The instructions 826 (e.g., processor-executable instructions) may also reside, completely or at least partially, within the main memory 804 (e.g., a non-transitory machine-readable storage medium) and/or within the processor 802 during execution thereof by the computer system 800, with the main memory 804 and the processor 802 also constituting machine-readable media 824.

While the machine-readable medium 824 is illustrated in an example embodiment to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding, or carrying the instructions 826 for execution by the machine and that cause the machine to perform any one or more of the methodologies of the present disclosure, or that is capable of storing, encoding; or carrying data structures utilized by or associated with such instructions 826. The term "machine-readable medium" shall accordingly be taken to include, but not be limited to, solid-state memories, and optical and magnetic media. Specific examples of machine-readable media 824 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disk read only memory (CD-ROM) and digital video disk read only memory (DVD-ROM) disks.

The instructions 826 may further be transmitted or received over a communication network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi® and WiMax® networks). The term "transmission medium" shall be taken to include any intangible medium that is capable of storing, encoding, or carrying the instructions 826 for execution by the machine, and includes digital or analog communications signals or other intangible media to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    receiving a first identifier for a first member, the first identifier associated with a first member profile comprising attributes of the first member;
    identifying, by one or more hardware processors, a set of second members associated with the first member, the set of second members associated with a set of second identifiers, the set of second identifiers associated with a set of second member profiles comprising attributes of the set of second members and a link to one or more members;
    generating, by the one or more hardware processors, a cluster comprising the first member profile and one or more member profiles of the set of second member profiles;
    generating, by the one or more hardware processors, a cluster representation comprising a set of cluster attributes, the set of cluster attributes comprising at least a portion of the attributes of the first member and the attributes of the set of second members;
    identifying, by the one or more hardware processors, a plurality of data sets associated with a set of core attributes, at least one core attribute of the set of core attributes corresponding to one or more attributes of the set of cluster attributes; and
    causing display of an identification for at least one data set of the plurality of data sets at a display device associated with the first member, the at least one data set is selected for display based on a determination that the set of second members is deficient in the one or more core attributes, the determination being based on a level of association between the cluster and one or more core attributes associated with the at least one data set being determined to be below a threshold level, the threshold level representing a level below which the set of second members is deficient in the one or more core attributes.

2. The method of claim 1, wherein generating the cluster further comprises:
    identifying an organizational scheme including the first member and at least a portion of the second members of the set of second members, the organizational scheme comprising a set of categories, each member of the first member and the portion of the second members being associated with at least one category of the set of categories; and
    generating a set of associations among the first member and one or more second members of the portion of second members, the set of associations representing an organizational relationship among the first member and the one or more second members.

3. The method of claim 2, wherein generating the cluster representation further comprises:
    identifying a cluster value for each profile attribute of a set of profile attributes, the cluster value for each profile attribute corresponding to attributes of the second members associated with the profile attribute.

4. The method of claim 3, wherein identifying the cluster value for each profile attribute further comprises:
    identifying member profiles in the cluster associated with the profile attribute;
    determining member profiles in the cluster associated with a validation for the profile attribute; and generating the cluster value based on the cluster, the members in the cluster associated with the profile attribute, and the members in the cluster associated with the validation.

5. The method of claim 3, wherein generating the cluster representation further comprises:
identifying, for the first member, one or more mismatched attributes comprising a profile attribute of the set of profile attributes absent from the first member profile; and
identifying a data set of the plurality of data sets having a core attribute associated with the one or more mismatched attributes.

6. The method of claim 5, wherein identifying the one or more mismatched attributes further comprises:
identifying an attribute threshold for the set of profile attributes;
determining one or more profile attributes having a cluster value below the attribute threshold; and
comparing, for the first member, the one or more profile attributes to attributes of the first member profile to identify the one or more mismatched attributes.

7. The method of claim 1, wherein selecting the at least one data set further comprises:
determining a data set strength for two or more data sets of the plurality of data sets, the data set strength representing one or more of a number of interactions with the data set, a type of interaction with the data set, and a member attribute value for members interacting with the data set;
determining a relative strength of the two or more data sets from the data set strength of each data set of the two or more data sets; and
selecting at least one data set based on the relative strengths of the two or more data sets.

8. A system comprising:
one or more hardware processors; and
a non-transitory processor-readable storage medium storing processor-executable instructions that, when executed by the one or more hardware processors, cause at least one hardware processor to perform operations comprising:
receiving a first identifier for a first member, the first identifier associated with a first member profile comprising attributes of the first member;
identifying a set of second members associated with the first member, the set of second members associated with a set of second identifiers, the set of second identifiers associated with a set of second member profiles comprising attributes of the set of second members and a link to one or more members;
generating a cluster comprising the first member profile and one or more member profiles of the set of second member profiles;
generating a cluster representation comprising a set of cluster attributes, the set of cluster attributes comprising at least a portion of the attributes of the first member and the attributes of the set of second members;
identifying a plurality of data sets associated with a set of core attributes, at least one core attribute of the set of core attributes corresponding to one or more attributes of the set of cluster attributes; and
causing display of an identification for at least one data set of the plurality of data sets at a display device associated with the first member, the at least one data set is selected for display based on a determination that the set of second members is deficient in the one or more core attributes, the determination being based on a level of association between the cluster and one or more core attributes associated with the at least one data set being determined to be below a threshold level, the threshold level representing a level below which the set of second members is deficient in the one or more core attributes.

9. The system of claim 8, wherein generating the cluster further comprises:
identifying an organizational scheme including the first member and at least a portion of the second members of the set of second members, the organizational scheme comprising a set of categories, each member of the first member and the portion of the second members being associated with at least one category of the set of categories; and
generating a set of associations among the first member and one or more second members of the portion of second members, the set of associations representing an organizational relationship among the first member and the one or more second members.

10. The system of claim 9, wherein generating the cluster representation further comprises:
identifying a cluster value for each profile attribute of a set of profile attributes, the cluster value for each profile attribute corresponding to attributes of the second members associated with the profile attribute.

11. The system of claim 10, wherein identifying the cluster value for each profile attribute further comprises:
identifying member profiles in the cluster associated with the profile attribute;
determining member profiles in the cluster associated with a validation for the profile attribute; and
generating the cluster value based on the cluster, the member profiles in the cluster associated with the profile attribute, and the members in the cluster associated with the validation.

12. The system of claim 10, wherein generating the cluster representation further comprises:
identifying, for the first member, one or more mismatched attributes comprising a profile attribute of the set of profile attributes absent from the first member profile; and
identifying a data set of the plurality of data sets having a core attribute associated with the one or more mismatched attributes.

13. The system of claim 12, wherein identifying the one or more mismatched attributes further comprises:
identifying an attribute threshold for the set of profile attributes;
determining one or more profile attributes having a cluster value below the attribute threshold; and
comparing, for the first member, the one or more profile attributes to attributes of the first member profile to identify the one or more mismatched attributes.

14. The system of claim 8, wherein selecting the at least one data set further comprises:
determining a data set strength for two or more data sets of the plurality of data sets, the data set strength representing one or more of a number of interactions with the data set, a type of interaction with the data set, and a member attribute value for members interacting with the data set;
determining a relative strength of the two or more data sets from the data set strength of each data set of the two or more data sets; and selecting at least one data set based on the relative strengths of the two or more data sets.

15. A non-transitory processor-readable storage medium storing processor-executable instructions that, when executed by one or more hardware processors, cause at least one hardware processor to perform operations comprising:
   receiving a first identifier for a first member, the first identifier associated with a first member profile comprising attributes of the first member;
   identifying a set of second members associated with the first member, the set of second members associated with a set of second identifiers, the set of second identifiers associated with a set of second member profiles comprising attributes of the set of second members and a link to one or more members;
   generating a cluster comprising the first member profile and one or more member profiles of the set of second member profiles;
   generating a cluster representation comprising a set of cluster attributes, the set of cluster attributes comprising at least a portion of the attributes of the first member and the attributes of the set of second members;
   identifying a plurality of data sets associated with a set of core attributes, at least one core attribute of the set of core attributes corresponding to one or more attributes of the set of cluster attributes; and
   causing display of an identification for at least one data set of the plurality of data sets at a display device associated with the first member, the at least one data set is selected for display based on a determination that the set of second members is deficient in the one or more core attributes, the determination being based on a level of association between the cluster and one or more core attributes associated with the at least one data set being determined to be below a threshold level, the threshold level representing a level below which the set of second members is deficient in the one or more core attributes.

16. The non-transitory processor-readable storage medium of claim 15, wherein generating the cluster further comprises:
   identifying an organizational scheme including the first member and at least a portion of the second members of the set of second members, the organizational scheme comprising a set of categories, each member of the first member and the portion of the second members being associated with at least one category of the set of categories; and
   generating a set of associations among the first member and one or more second members of the portion of second members, the set of associations representing an organizational relationship among the first member and the one or more second members.

17. The non-transitory processor-readable storage medium of claim 16, wherein generating the cluster representation further comprises:
   identifying a cluster value for each profile attribute of a set of profile attributes, the cluster value for each profile attribute corresponding to attributes of the second members associated with the profile attribute.

18. The non-transitory processor-readable storage medium of claim 17, wherein generating the cluster representation further comprises:
   identifying, for the first member, one or more mismatched attributes comprising a profile attribute of the set of profile attributes absent from the first member profile; and
   identifying a data set of the plurality of data sets having a core attribute associated with the one or more mismatched attributes.

19. The non-transitory processor-readable storage medium of claim 18, wherein identifying the one or more mismatched attributes further comprises:
   identifying an attribute threshold for the set of profile attributes;
   determining one or more profile attributes having a cluster value below the attribute threshold; and
   comparing, for the first member, the one or more profile attributes to attributes of the first member profile to identify the one or more mismatched attributes.

20. The non-transitory processor-readable storage medium of claim 15, wherein selecting the at least one data set further comprises:
   determining a data set strength for two or more data sets of the plurality of data sets, the data set strength representing one or more of a number of interactions with the data set, a type of interaction with the data set, and a member attribute value for members interacting with the data set;
   determining a relative strength of the two or more data sets from the data set strength of each data set of the two or more data sets; and
   selecting at least one data set based on the relative strengths of the two or more data sets.

* * * * *